(12) United States Patent
Avant, Jr. et al.

(10) Patent No.: US 6,436,523 B1
(45) Date of Patent: Aug. 20, 2002

(54) DELAMINATED SEDIMENTARY MICA

(75) Inventors: David M. Avant, Jr., Sandersville; Donald G. Turner, Washington, both of GA (US)

(73) Assignee: Georgia Industrial Minerals, Inc., Sandersville, GA (US)

( * ) Notice: Subject to any disclaimer, the term of this patent is extended or adjusted under 35 U.S.C. 154(b) by 0 days.

(21) Appl. No.: 09/531,109

(22) Filed: Mar. 17, 2000

Related U.S. Application Data (60) Continuation of application No. 09/012,784, filed on Jan. 23, 1998, now abandoned, which is a division of application No. 08/661,985, filed on Jun. 12, 1996.

(51) Int. Cl.$^7$ .............................. B32B 5/16; C01B 33/42
(52) U.S. Cl. ...................... 428/331; 423/328.3; 428/402
(58) Field of Search ................................ 428/331, 302; 423/328.3

(56) References Cited

U.S. PATENT DOCUMENTS 5,775,601 A * 7/1998 Avant, Jr. et al. ................ 241/4
5,797,547 A * 8/1998 Duncan .......................... 241/4

* cited by examiner

*Primary Examiner*—Hoa T. Le
(74) *Attorney, Agent, or Firm*—Myers Bigel Sibley & Sajovec, P.A.

(57) ABSTRACT

Sedimentary mica flakes are produced having a bulk density of between about five and one-half pounds per cubic feet and eight pounds per cubic feet (5.5–11 lbs/ft$^3$), a high aspect ratio, and a G.E. brightness between about seventy-five and ninety (75–90). Operations include applying shear forces to delaminate the mica into flakes. Shear forces are applied by rotating a plurality of arcuate blades within a confined chamber containing the mica, such that the mica is forced between an outer portion of each blade and said chamber. The resulting delaminated mica flakes may be dried and classified.

6 Claims, 5 Drawing Sheets

DELAMINATED SEDIMENTARY MICA

CROSS REFERENCE TO RELATED APPLICATION

This is a continuation of Ser. No. 09/012,784, filed Jan. 23, 1998 and abandoned Aug. 11, 2000 which is a divisional of allowed application Ser. No. 08/661,985, filed Jun. 12, 1996.

FIELD OF THE INVENTION

The present invention relates generally to silicate minerals, and more particularly to sedimentary mica.

BACKGROUND OF THE INVENTION

Mica comprises a class of silicate minerals having perfect basal cleavage and widely varying chemical compositions. The most common species of mica are muscovite $KAl_2(AlSi_3O_{10})(OH)_2$, phlogopite $K(Mg,Fe)_3(AlSi_3O_{10})(OH)_2$, and biotite $K(Fe,Mg)_3(AlSi_3O_{10})(OH)_2$. These species are rock forming minerals occurring within a variety igneous, metamorphic and sedimentary rocks, as well as in many mineral deposits.

Mica has a variety of commercial uses in both sheet form and in flake form. Flake mica is used as both a filler and coating in paint, wallpaper, plastics, cosmetics, and a variety of other products. Flake mica is typically produced by grinding crude mica, which is typically in the form of books or stacks of numerous mica platelets bonded together in a face-to-face configuration. The grinding process breaks up these stacks to produce individual platelets of mica. Grinding is typically performed in Chaser mills, and the like, having rollers or balls that roll over the mica for a period of generally six to eight hours per ton. Delamination enhances the sheen and slip of the mica, and makes a more desirable product.

The mills currently used are designed to grind coarse mica ore derived from igneous intrusive rock and metamorphic schist wherein the mesh size is generally greater than or equal to one-hundred (100) mesh. Unfortunately, sedimentary mica, due to its naturally fine size (generally less than or equal to 100 mesh), will not delaminate in these mills at a production rate that is economical. Consequently, sedimentary mica is typically not used to produce mica flakes.

In addition, the kaolin and sand industries typically avoid mining clays containing sedimentary mica. The platey nature of sedimentary mica causes problems during screening steps in kaolin production processes. The kaolin industry typically processes kaolin having a mesh size less than or equal to three-hundred-twenty-five (325) mesh. Consequently, sedimentary mica contained within the kaolin slurry often causes blinding of the screens, thereby hampering production. In addition, ultra-fine mica also retards slurry makedown and is detrimental to Brookfield viscosity, because of its platey shape and dielectric properties.

The sand industry avoids mining sand from areas containing a high percentage of sedimentary mica. Unfortunately, sedimentary mica is present in most sand deposits. Consequently, during sand production, a majority of the washing process steps are for the purpose of removing silts and sedimentary mica due to their detrimental properties. Because of the friable, flexible, and platey nature of sedimentary mica, the dried strength of mortar and concrete is reduced when sedimentary mica is present. Furthermore, because of its high surface area, sedimentary mica platelets are highly absorptive of water. Consequently, the presence of sedimentary mica in concrete sand may cause the water demand for a mixture to increase beyond normal levels. For certified concrete mixtures, water added beyond specifications may render the concrete unusable.

SUMMARY OF THE INVENTION

It is therefore an object of the present invention to provide economical methods for continuously delaminating sedimentary mica.

It is another object of the present invention to economically produce a superior grade of flake mica product from sedimentary mica, thereby creating a demand for sedimentary mica, which has, until now, been practically non-existent.

These and other objects are accomplished, according to the present invention, by systems and methods for producing a delaminated sedimentary mica product. A substantially white delaminated mica product, comprising a plurality of sedimentary mica flakes, substantially all of which are less than forty-four microns ($44\mu$), and having a bulk density of between about five and one-half pounds per cubic feet and eleven pounds per cubic feet (5.5–11 $lbs/ft^3$), a high aspect ratio, and a G.E. brightness between about seventy-five (75) and ninety (90), may be produced, according to the present invention.

A first slurry of crude sedimentary mica and water is prepared, and shear forces are applied thereto to delaminate the mica therein into flakes. The application of shear forces to the first slurry preferably includes rotating a plurality of arcuate blades within a confined cylindrical delaminating chamber containing the first slurry, such that the first slurry is forced between an outer portion of each blade and the chamber. The outer portion of each blade is spaced from and substantially concentric with a portion of the delaminating chamber. Preferably, the first slurry comprises mica particles larger than about 325 mesh size. In addition, the first slurry may have a solids to water ratio in the range of about fifty to seventy percent (50%–70%).

The delaminated mica flakes are mixed with water to produce a second slurry. The second slurry may have a solids to water ratio in the range of about 10%–30%. Fine mica flakes are separated from coarse mica flakes within the second slurry, preferably via a centrifuge, and the separated fine mica flakes are dried, preferably to a moisture content of one percent (1%) or less. Impurities may be removed from the separated fine mica flakes after drying. The dried mica flakes may then be further-classified according to particle size.

Additionally, shear forces may be applied to the coarse mica flakes separated within the second slurry to delaminate these flakes further. These delaminated mica flakes are mixed with water to produce a third slurry. Fine mica flakes are then separated from coarse mica flakes within the third slurry, preferably via a centrifuge, and the separated fine mica flakes are dried, preferably to a moisture content of 1% or less. The third slurry has a solids to water ratio in the range of about ten to thirty percent (10%–30%). The step of applying shear forces to the coarse mica flakes preferably is carried out as described above, via a plurality of arcuate blades rotating within a confined cylindrical chamber. Additional separation steps may be performed followed by additional shear force delamination, as desired.

The present invention is advantageous because otherwise unused sedimentary mica can be processed to produce a superior grade of mica flake product economically. The process according to the present invention, produces mica flakes that are clearly differentiated from other wet ground mica flakes because of better brightness and color, lower bulk density, and higher surface area.

Because of the manner in which shear forces are applied to the mica books, delamination is obtained quickly as compared with prior art delamination methods. Consequently, sedimentary mica, other low abrasion minerals, and any other materials requiring delamination or particle size reduction can be delaminated and processed on a continuous basis using the methods of the present invention. Furthermore, the present invention is advantageous in that it does not require the use of grinding media.

DETAILED DESCRIPTION OF THE PREFERRED EMBODIMENT

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Conventional methods of delaminating mica have only been able to achieve a flake mica product having a bulk density of about eight to fourteen pounds is per cubic feet (8–14 lbs/ft$^3$), and a G.E. brightness of about sixty-five to eighty (65–80). G.E. brightness for mica is measured using a five-hundred forty-seven (547) nanometer wavelength and green, filter. The term "aspect ratio", as used herein, is the width of a particle divided by the particle's thickness. It is desirable to have a high aspect ratio for flake mica used as a coating and filler.

Conventional methods of delaminating mica to produce a flake product typically involve a wet grinding process, wherein mica having a moisture content of about twenty-five to thirty-five percent (25%–35%) is processed in batches within Chaser or Muller mills. Typically, a charge of mica is placed within a mill and large wheels or rollers roll over the mica as the mill is rotated, causing the mica to delaminate for a period of several to many hours.

Figures 1, 2:
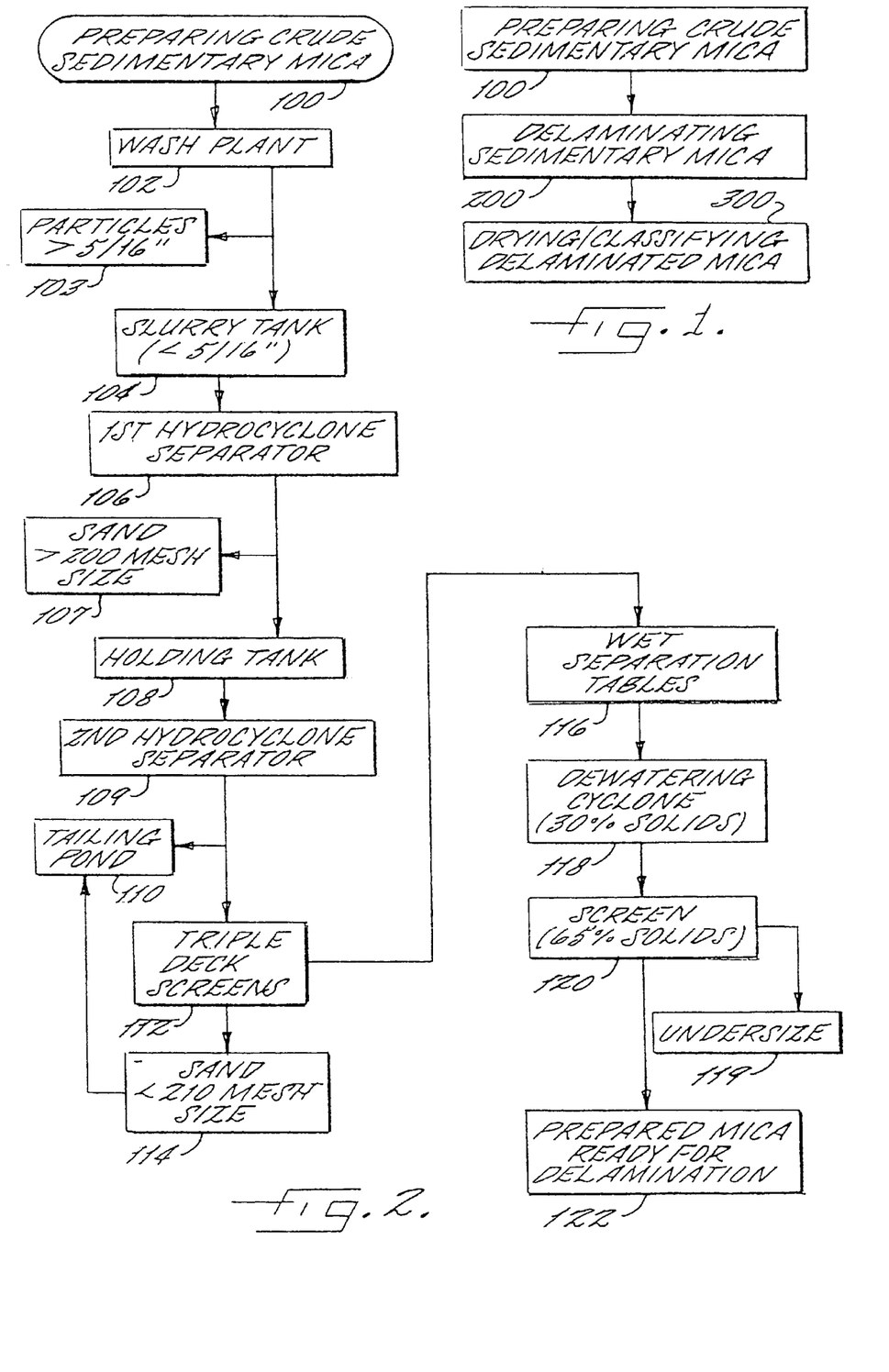
FIG. 1 is a flow chart illustrating operations for continuously delaminating sedimentary mica, according to the present invention.
FIG. 2 is a flow chart illustrating operations for preparing crude sedimentary mica for delamination, according to the present invention.

Referring now to FIG. 1, operations for continuously delaminating sedimentary mica to produce mica flakes having a bulk density of between about five and one-half pounds per cubic feet and eleven pounds per cubic feet (5.5–11 lbs/ft$^3$), a generally higher aspect ratio than conventional flake mica products, and a G.E. brightness between about seventy-five and ninety (75–90), according to the present invention, are schematically illustrated. Operations include preparing crude sedimentary mica for delamination (Block 100), delaminating the prepared mica (Block 200), and drying and/or classifying delaminated mica (Block 300). These operations are described in detail below. It is understood that feed rates of material and flow rates of water used throughout the continuous delamination process are variable depending on the size, type, and number of equipment used. These feed and flow rates may vary from those stated herein without departing from the spirit and intent of the present invention. Furthermore, temperatures, pressures and other parameters may vary from those stated herein without departing from the spirit and intent of the present invention.

As used in the below-described operations, the term "water" shall refer to a liquid having an aqueous character. Such a liquid consists primarily of water, normally greater than about ninety percent (90%) by weight, and can be essentially pure water in certain. circumstances. For example, a liquid having an aqueous character can be distilled water, tap water, or the like. However, a liquid having an aqueous character can include water having various substances incorporated therein, including, but not limited to, pH buffers, pH adjusters, organic materials, inorganic materials, and the like.

Crude Sedimentary Mica Preparation Operations

Referring now to FIG. 2, operations and means for preparing crude sedimentary mica for delamination (Block 100) will now be described. Crude ore containing sand, sedimentary mica, and clay, is fed, preferably via conveyor, to a wash plant (Block 102), where the ore is mixed with water and then screened on a vibrating screen, or other particle removal means. Preferably, a screen having a mesh size of five-sixteenths of an inch (⅝") is used. Particles passing through the vibrating screen are directed to an agitated slurry tank (Block 104). In the slurry tank, the water content is adjusted to produce a slurry having approximately ten percent (10%) solids by volume. Particles not passing through the screen are rejected (Block 103) and are not processed further, according to the present invention.

An exemplary feed rate of crude ore to the wash plant (Block 102) is one-hundred-twenty tons per hour (120 tph). Approximately one-thousand five-hundred gallons per minute (1,500 gpm) of water is required to be mixed with crude ore having a feed rate of 120 tph. An acceptable size slurry Lank for the 120 tph feed rate is thirty-four-hundred (3,400) gallons.

From the slurry tank (Block 104), the slurry is pumped to a first hydrocyclone separator (Block 106), wherein a segregation of particles based on size and shape takes place. An acceptable slurry flowrate from the slurry tank, based on the crude ore feed rate of 120 tph, is nineteen-hundred gallons per minute (1,900 gpm) at a pressure of approximately twelve pounds per square inch (12 psi). An exemplary hydrocyclone separator is a twenty-four inch (24") separator manufactured by Linatex. The first hydrocyclone separator (Block 106) separates the sand portion of the slurry having particle sizes greater than about two-hundred (200) mesh, and this portion is stockpiled for sale as construction sand (Block 107). The remaining slurry, comprising mica particles having a size of less than about thirty (30) mesh, and sand and clay particles having a size of less than about two-hundred (200) mesh, is directed to a holding tank (Block 108). The slurry in the holding tank (Block 108) comprises about eighty to ninety percent (80%–90%) of the sedimentary mica content of the initial crude ore. An acceptable size holding tank, based on the crude ore feed rate of 120 tph, is about three-thousand (3,000) gallons.

Slurry in the holding tank is then pumped to a second hydrocyclone separator (Block 109) wherein particles having a size above about three-hundred twenty-five (325) mesh are segregated from the slurry. Preferably, the second hydrocyclone separator comprises a set of thirty-two (32) four inch (4") hydrocyclone separators. The slurry containing particle sizes smaller than about three-hundred twenty-five (325) mesh, along with most of the water, is directed to a tailings pond (Block 110), and are not processed further according to the present invention.

The remaining material contains solids having particle sizes greater than's about three-hundred twenty-five (325) mesh, of which about thirty to sixty percent (30%–60%) is sedimentary mica. This material, is screened over a pair of Brandt Cascade triple deck screens having mesh sizes of fifty (50), one-hundred (100), and two-hundred ten (210), respectively (Block 112). Because of the low density and particle shape of the sedimentary mica particles at this stage, almost all of the mica particles having a size greater than about three-hundred twenty-five (325) mesh is retained on the screens. Sand having a mesh size of less than about two-hundred-ten (210), is directed to a tailings pond (Block 114), and is not processed further according to the present invention.

The triple deck screens (Block 112) make three (3) size cuts according to their respective mesh sizes. Each cut is individually slurried by adding water and then pumped to multiple separation tables (Block 116) for segregating the low density/platey mica from the higher density/sub-round sand fraction. In a preferred embodiment, six (6) Diester concentration tables are used for this purpose. Concentrated material of at least about ninety percent (90%) mica is collected from the separation tables and pumped to a dewatering cyclone (Block 118) wherein a dewatered concentrate of about thirty percent (30%) solids is produced. Preferably, a bank of four (4) four inch (4") Brandt cyclones are used for this purpose.

The dewatered concentrate is then screened to further dewater the concentrate to about sixty-five percent (65%) solids (Block 120). A preferred screen is a rectangular Brandt Linear Motion screen. The dewatered concentrate is then directed to either delamination operations (Block 200) or to storage to await delamination operations (Block 122).

Preferably, the slurry flows in the above operations are obtained using rubber-lined centrifugal pumps of rated capacity for the given flow rates. However, as would be known by those having skill in the art, different pumps may be used to obtain similar flow rates and capacities.

Delamination Operations

Figure 3:
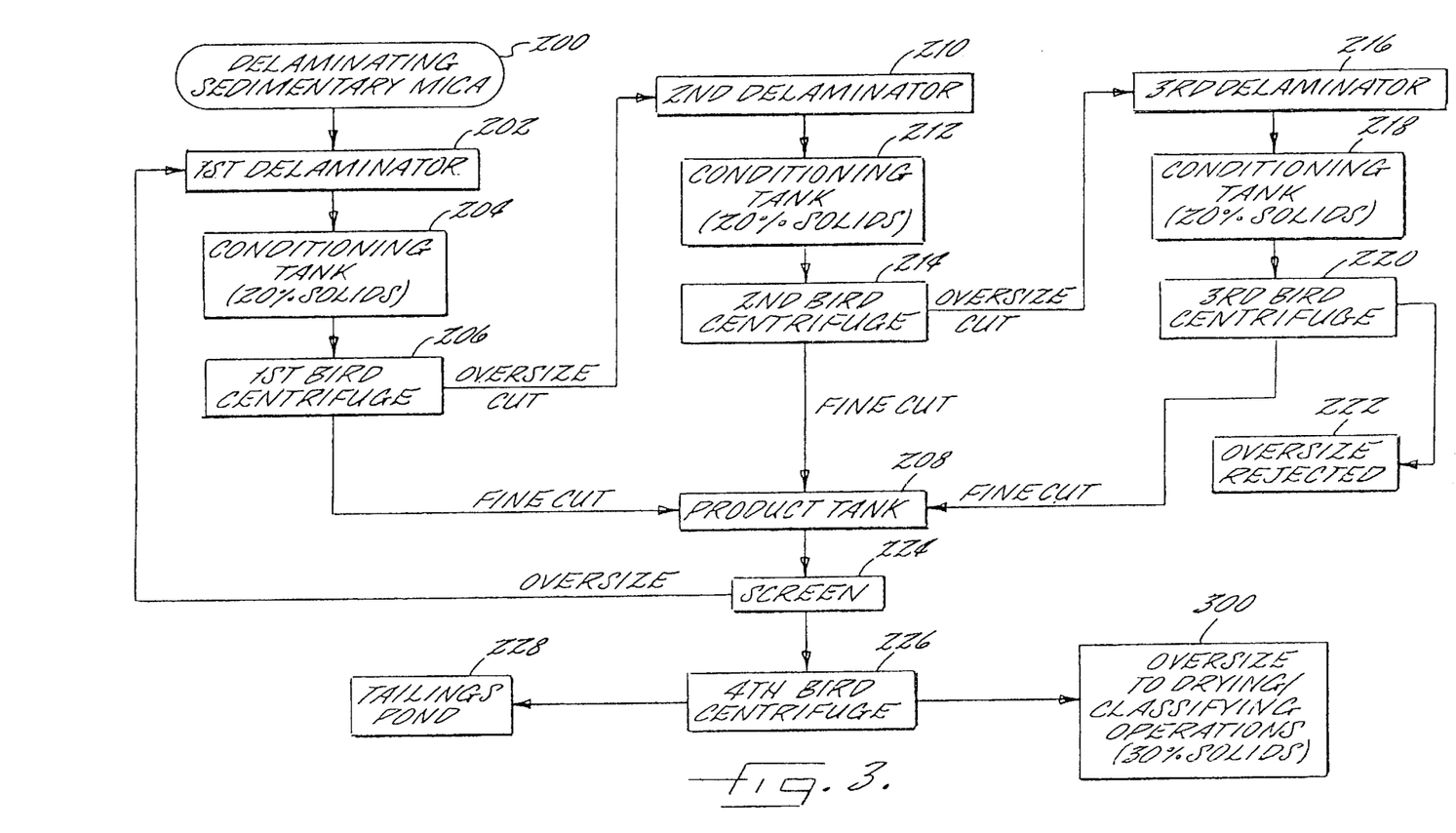
FIG. 3 is a flow chart illustrating operations for delaminating sedimentary mica, according to the present invention.

Referring now to FIG. 3, operations and means for delaminating sedimentary mica to obtain a flake mica product having a bulk density of between about five and one-half pounds per cubic feet and eleven pounds per cubic feet (5.5–11 lbs/ft$^3$), a generally higher aspect ratio than conventional flake mica products, and a G.E. brightness between about seventy five and ninety (75–90), will be described. The dewatered sedimentary mica concentrate produced in Block 120 is fed into a first delaminator at a preferred rate of about two (2) tph (Block 202). The size of each delaminator can be scaled up or down to meet the production needed. Operating speeds are adjustable to suit the particular mineral being processed, difficulty of delamination, and the quality of the product desired.

Figure 5:
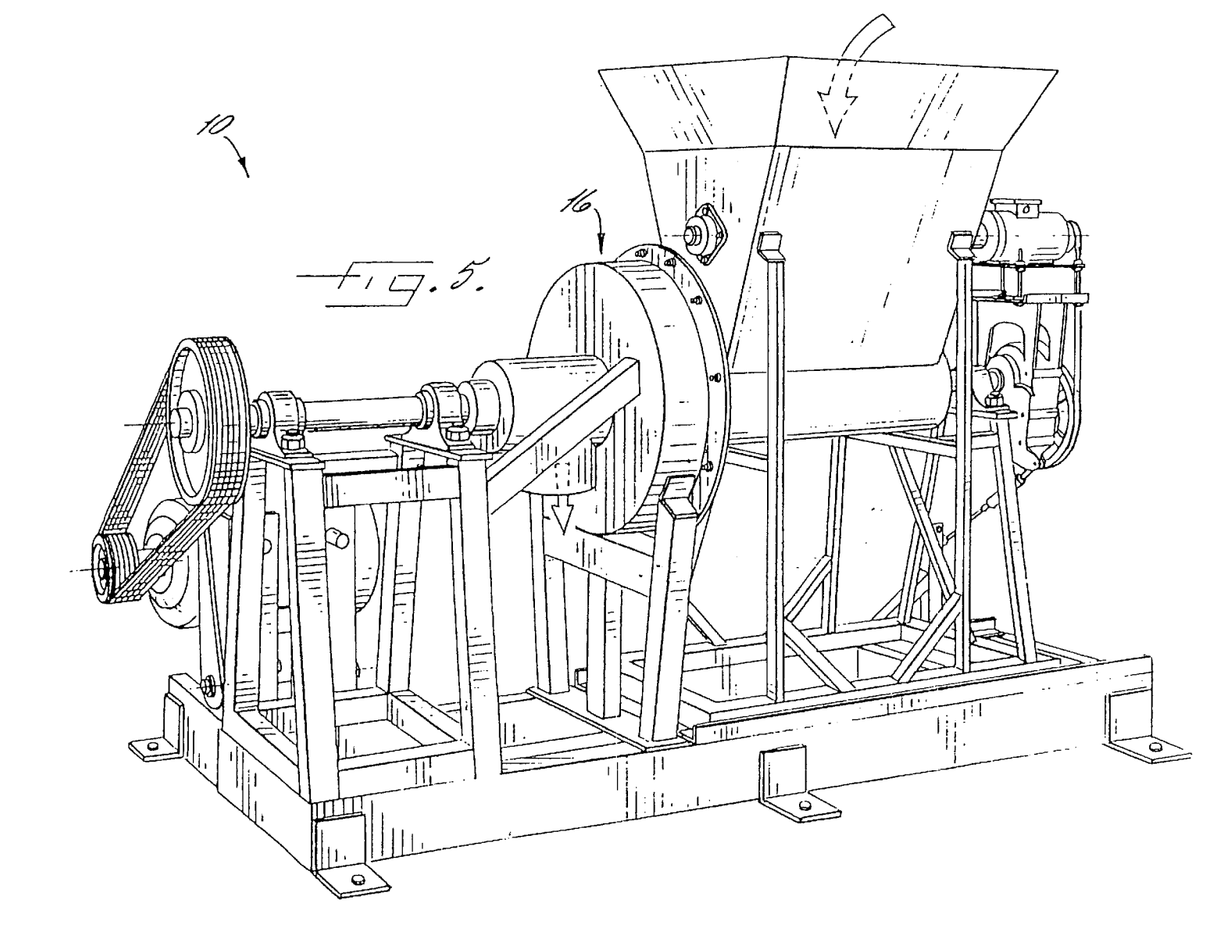
FIG. 5 illustrates a delaminator for delaminating sedimentary mica, according to the present invention.
Figure 6A:
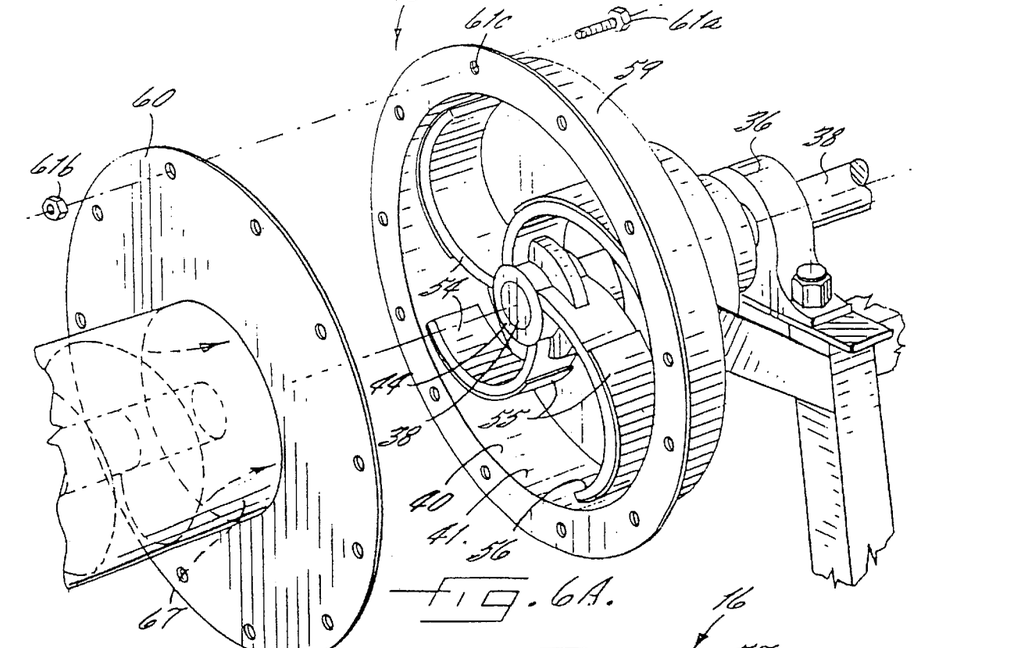
FIG. 6A is an exploded perspective view of the delaminating chamber in the delaminator illustrated in FIG. 5.
Figure 6B:
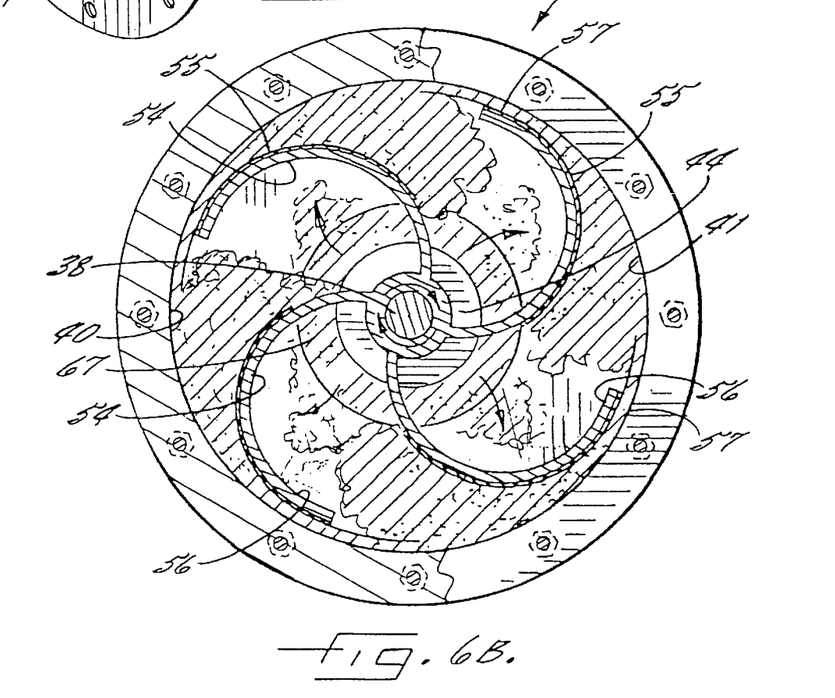
FIG. 6B is a cross-sectional view of the delaminating chamber illustrated in FIG. 6A.

A preferred apparatus for delaminating sedimentary mica, according to the present invention, is illustrated in FIGS. 5 and 6A–6B and is described in U.S. Pat. No. 5,759,547 entitled "Methods and Apparatus for Delaminating Sedimentary Mica". However, it is understood that other devices for imparting shear forces on mica to delaminate it may be used without departing from the spirit and intent of the present invention.

In the illustrated embodiment, the delaminator 10 comprises a delaminating chamber 16 in which shear forces are imparted on mica books to cleave individual platelets therefrom. The delaminator 10 imparts shear forces in a direction generally parallel to the cleavage planes in each book, without subjecting the mica to bending and compressive forces, as is the case with conventional mica milling devices. Conventional milling devices, through the use of rollers, balls, and variously-shaped impellers, impart a "mortar and pestle" action on platey minerals such as mica, wherein larger particles are ground into powder, rather than being cleaved into individual platelets. By contrast, the present invention delaminates each book of sedimentary mica into very small flakes through the application of shear forces, and avoids grinding the mica into a powder. The shear forces imparted upon the mica also generates heat due to friction. This heat facilitates separation of individual platelets from the mica books.

Referring to FIGS. 6A–6B, a preferred delaminating chamber is illustrated. The delaminating chamber 16, defined by housing 59 and cover 60 in the illustrated embodiment, is generally cylindrical in shape and the impeller 44 is configured to rotate within the chamber without contacting the inner surface 40. The impeller 44 has multiple curved blades 54 extending outwardly from the shaft 38 towards the inner surface of the delaminating chamber in an arcuate shape. The delaminating chamber inner surface 40 preferably has a replaceable lining made from stainless steel, mild steel, cast iron, plastics, and the like. The number of blades on an impeller typically depends on the size of the particular delaminating chamber. For large delaminating chambers (typically 24" in diameter and larger), four (4) or more blades may be used. For delaminating chambers smaller than 24", two (2) to four (4) blades are preferred. Exemplary dimensions for each blade in the first delaminator, which is preferably 30" in diameter, are: three-quarters of an inch (0.75") thickness; four inches (4") width; and twenty and three-quarters inches (20.75") length. Exemplary dimensions for each blade in the second and third delaminators, which are preferably 24" in diameter, are: three-quarters of an inch (0.75") thickness; four inches (4") width; and sixteen and three-quarters inches (16.75") length. As would be understood by those having skill in the art, the present invention is not limited to these blade dimensions. Blade dimensions may vary according to the speed of operation and the type of product delaminated therewithin.

The blades 54 may be formed from various materials including mild steel, stainless steel, or hard surfaced metal. The material selected depends on the abrasiveness of the mineral being processed. In the illustrated embodiment, each impeller blade 54 has a replaceable lining 55 made from stainless steel, mild steel, hard steel, plastics, and the like, attached along an end portion 56 of the blade adjacent the delaminating chamber inner surface 40. Preferably, the end portion 56 of each blade 54, distal from the impeller, defines an arc spaced from and substantially concentric with the delaminating chamber inner surface 40. The clearance between the arc defined by the end portion 56 of each blade 54 and the delaminating chamber 16 inner surface 40 is preferably between about one-twentieth of an inch (0.05") and three inches (3") for sedimentary mica, and is referred to as the "pinch point" 57. The replaceable linings for the delaminating chamber inner surface and the blades permits the pinch point dimension to be maintained as well as protect the blades and delaminating chamber from wear.

In the illustrated embodiment, the delaminating chamber 16 is continuously fed with mica concentrate 58 prepared as described above, through an opening 67 in the housing cover 60, which is secured to the delaminating chamber housing 59 via a plurality of bolts 61a and nuts 61b. The centrifugal force of the spinning impeller 44 accelerates the mica outwardly to the end portion 56 of each blade 54 where it is slowed due to friction and drag with the delaminating chamber inner surface 40. The movement of each blade 54 over the mica causes a shear force to be exerted on the mica at each pinch point 57. Because of the curved configuration of the outer portion 56 of each blade 54, this shear force is in a direction generally parallel to the books of mica, and thereby breaks the covalent cleavage bond of each platelet in a book.

Preferably, the impeller of the illustrated embodiment is rotated between about six-hundred (600) rpm and twelve-hundred (1,200) rpm. However, other speeds may be used depending on the size of the delaminating chamber and the type of shear force delaminator used. On average, sedimentary mica concentrate 58 resides within the illustrated delaminating chamber 16 for between about two (2) minutes and twelve (12) minutes. Water may be added to the material within each delaminating chamber 16 as needed.

Returning now to FIG. 3, the delaminated mica flakes are discharged from the first delaminator and directed to an agitated conditioning tank or other equivalent mixing means, and is mixed with water to make a slurry of about twenty percent (20%) solids (Block 204). The slurry is then pumped into a first Bird centrifuge, or equivalent separation means, which separates flakes within the slurry into a fine cut and an oversize cut (Block 206). An exemplary Bird centrifuge size is twenty-four inches by thirty-eight inches (24"×38"). The fine portion of the cut is directed to a product tank (Block 208). An exemplary product tank size for the flow rates of the present invention is about six-hundred (600) gallons. Preferably the tank is agitated.

The oversize mica cut from the first Bird centrifuge is directed to a second delaminator that generally has a smaller diameter delaminating chamber than the first delaminator (Block 210): The oversize mica cut is subjected to delamination via the second delaminator (Block 210). The delaminated product exits the second delaminator and is directed to a conditioning tank (Block 212). The delaminated mica is mixed with water to produce about twenty percent (20%) solids slurry and is then pumped to a second Bird centrifuge that is generally smaller than the first Bird centrifuge (Block 214). The fine mica cut from the second Bird centrifuge is directed to the product tank (Block 208), and the oversize mica cut is directed to a third delaminator for additional delamination (Block 216).

The third delaminator is preferably the same size as the second delaminator; however, various sizes may work satisfactorily. The oversize mica cut is subjected to delamination via the third delaminator Block 216). The delaminated product exits the third delaminator and is directed to a conditioning tank (Block 218). The delaminated mica is mixed with water o produce about twenty percent (20%) solids slurry and is then pumped to a third Bird centrifuge that is generally the same size as the second Bird centrifuge (Block 220). The fine mica cut from the third Bird centrifuge is directed to the product tank (Block 208), and the oversize mica cut is discarded, rerun through the delamination process, sold as feed stock, or sized to produce a coarse delaminated sedimentary mica product (Block 222).

The combined fine cuts from the first, second, and third Bird centrifuges are slurried in the product tank (Block 208) and continuously overflowed onto a two-hundred (200) mesh screen to remove tramp and oversize mica (Block 224). A preferable screen is a forty-eight inch (48") diameter Sweco-type screen. The oversize mica is returned to the first delaminator for additional delamination (Block 202). The slurry containing mica particles smaller than about two-hundred (200) mesh is pumped to a fourth Bird centrifuge for the purpose of making a two micron ($2\mu$) desliming cut (Block 226). The fines or slimes are discarded to a tailings pond (Block 228) and the oversize mica cut, which exits the centrifuge at about thirty percent (30%) solids, is directed to drying and classifying operations (Block 300).

Drying/Classifying Milled Mica

Figure 4:
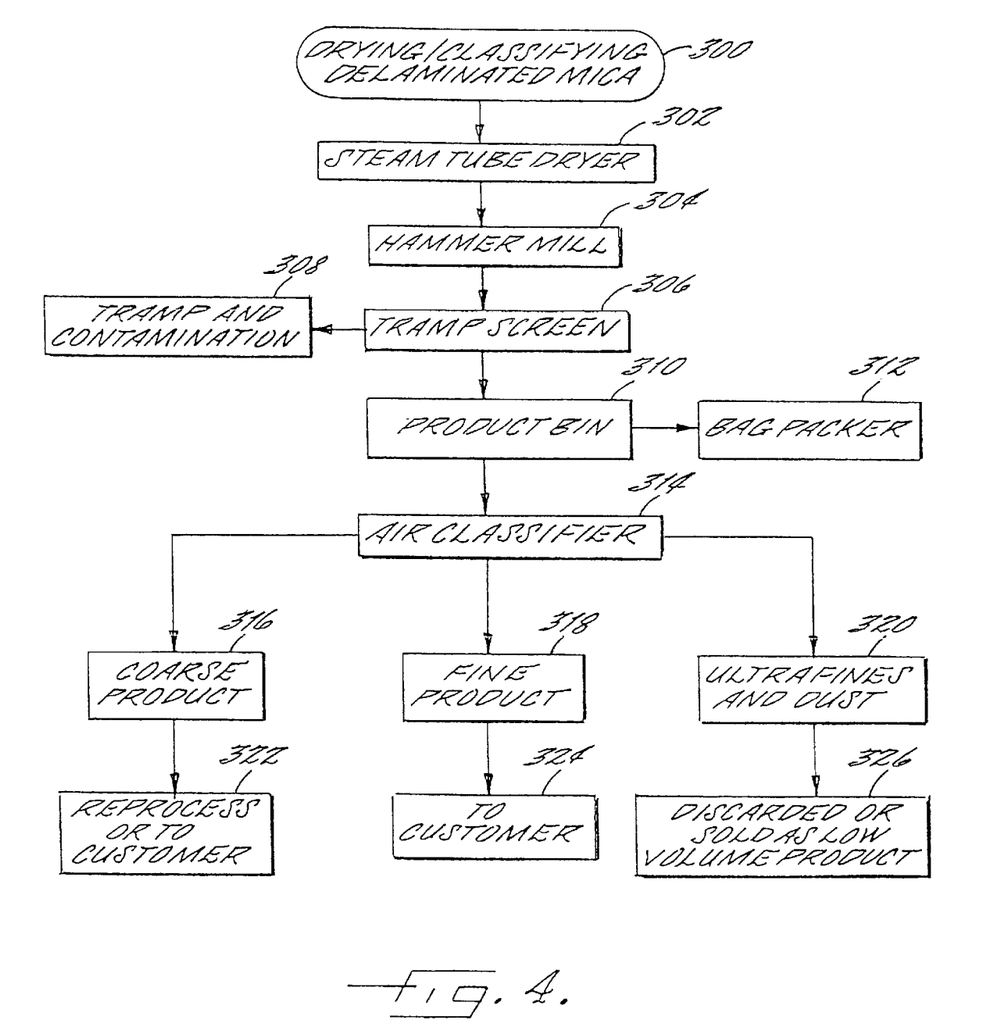
FIG. 4 is a flow chart illustrating operations for drying and classifying delaminated sedimentary mica, according to the present invention.

Referring now to FIG. 4, operations and means for drying and/or classifying delaminated sedimentary mica, according to the present invention, will be described. The oversize mica cut from the fourth Bird centrifuge (Block 226), is directed to a steam dryer and dried to less than one percent (<1%) free moisture (Block 302). Preferably, a screw conveyor is used to direct the mica into the steam dryer. A preferable size steam tube dryer for the initial crude ore flow rate is about six feet by forty feet (6'×40'). Dried mica product from the steam tube dryer is then conveyed, preferably via screw conveyor and bucket elevator, into a Hammer mill for delumping (Block 304). A generally cylindrical milling chamber having a diameter of about twenty-four inches (24") is satisfactory for this operation, although other sizes may be used, as well. No actual milling is done in the Hammer mill, the mill is used only to remove lumps from the dried mica product. The de-lumped dried mica product is directed, preferably via bucket elevator, to a fifty (50) mesh tramp screen, or equivalent impurity removal means, to remove any tramp and contamination (Block 306). A preferable size tramp screen is a forty-eight inch (48") diameter Sweco screen.

Screened mica product from the tramp screen is fed, preferably via bucket elevator and screw conveyor, to a product bin (Block 310), which is preferably outfitted with a bag packer for final product packaging (Block 312). Alternatively, delaminated mica product from the product bin may be directed, preferably via screw conveyor and bu-cket elevator, into means for classifying the mica product into desired particle size ranges (Block 314).

Preferably, an air classification system is employed.

An exemplary air classification system is an RSG one ton per hour (1 ton/hr) system. The air classification system is preferably configured to yield a coarse mica product (Block 316), a fine mica product (Block 318), and an ultrafine mica product (Block 320). The coarse product is typically reprocessed (Block 322). The fine mica product may be bagged and sold to customers (Block 324). The ultrafines, including mica dust, typically are directed to a bag type collector and may be discarded or sold as a low volume product (Block 326).

The delaminated mica product produced by the methods and apparatus of the present invention is comprised of delaminated mica flakes having a bulk density of between about 5.5 and 11 lbs/ft$^3$, a generally higher aspect ratio than conventional flake mica products, and a G.E. brightness between about seventy-five and ninety (75–90). The present invention is not limited to the processing of mica. Other materials and minerals may be processed using the operations described above. Adjustments to flow rates, pressures, and other parameters may be necessary, depending on the mineral being processed, however, such changes and variations do not depart from the spirit or intent of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A substantially white delaminated mica product, comprising a plurality of sedimentary mica flakes, wherein at least fifty percent (50%) of the plurality of sedimentary mica flakes are less than 44 microns, said flakes having a bulk density greater than about 5.5 lbs/fl$^3$, and a high aspect ratio.

2. A substantially white mica product according to claim 1 further comprising a G.E. brightness between about 75 and 90.

3. A substantially white mineral product having a bulk density greater than about 5.5 lbs/ft$^3$, and a high aspect ratio, comprised of a plurality of delaminated sedimentary mica flakes produced by applying shear forces to books of crude sedimentary mica.

4. A substantially white mineral product according to claim 3 further comprising a G.E. brightness between about 75 and 90.

5. A substantially white delaminated mica product, comprising a plurality of sedimentary mica flakes, wherein at least fifty percent (50%) of the plurality of sedimentary mica flakes are less than 44 microns, said flakes having a bulk density between about 5.5 and 24 lbs/ft$^3$, a high aspect ratio, and a G.E. brightness between about 75 and 90.

6. A substantially white mineral product having a bulk density between about 5.5 and 24 lbs/ft$^3$, a G.E. brightness between about 75 and 90, and a high aspect ratio, the substantially white mineral product comprised of a plurality of delaminated sedimentary mica flakes produced by applying shear forces to books of crude sedimentary mica.

* * * * *